United States Patent
Burgoa

(10) Patent No.: US 11,988,486 B2
(45) Date of Patent: May 21, 2024

(54) COUNTER-UNDERWATER VEHICLE APPARATUS AND MARKER

(71) Applicant: United States of America as represented by the Secretary of the Navy, San Diego, CA (US)

(72) Inventor: Robert Burgoa, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 121 days.

(21) Appl. No.: 17/938,074

(22) Filed: Oct. 5, 2022

(65) Prior Publication Data

US 2024/0118058 A1  Apr. 11, 2024

(51) Int. Cl.
| | |
|---|---|
| *B63G 8/28* | (2006.01) |
| *B63C 7/22* | (2006.01) |
| *F41H 11/10* | (2006.01) |
| *A01K 29/00* | (2006.01) |
| *B63G 9/00* | (2006.01) |

(52) U.S. Cl.
CPC .............. *F41H 11/10* (2013.01); *B63G 8/28* (2013.01); *A01K 29/00* (2013.01); *B63C 7/22* (2013.01); *B63G 9/00* (2013.01)

(58) Field of Classification Search
CPC .......... F41H 11/10; B63G 8/28; B63G 13/00; B63G 9/04; B63C 7/16; B63C 7/22; B63C 7/26; A01K 29/00
See application file for complete search history.

(56) References Cited

U.S. PATENT DOCUMENTS

| | | | | | |
|---|---|---|---|---|---|
| 3,957,296 | A | * | 5/1976 | Langguth | B66C 1/0293 294/186 |
| 4,015,873 | A | * | 4/1977 | Langguth | B63C 7/20 294/66.1 |
| H1533 | H | * | 6/1996 | Bowers | 119/174 |
| 6,332,432 | B1 | * | 12/2001 | Marshall | A01K 61/90 119/859 |
| 9,308,970 | B1 | * | 4/2016 | Gefken | B63G 13/00 |

(Continued)

FOREIGN PATENT DOCUMENTS

| | | | | |
|---|---|---|---|---|
| WO | WO-2017097966 A1 | * | 6/2017 | B63G 7/02 |
| WO | WO-2022106807 A1 | * | 5/2022 | A01K 61/95 |

*Primary Examiner* — Andrew Polay
(74) *Attorney, Agent, or Firm* — Naval Information Warfare Center, Pacific; Kyle Eppele; Evan Hastings

(57) ABSTRACT

A counter-underwater vehicle apparatus and marker. Moreover, a counter-underwater vehicle apparatus comprising a plurality of entanglement lines; a box configured to contain the plurality of entanglement lines; a suction cup coupled to the box configured to attach the box to a surface of an underwater vehicle; a release mechanism coupled to the box configured to detach the box from a bite plate and release the plurality of entanglement lines; and the bite plate selectively coupled to the release mechanism. Additionally a marker configured to highlight the location of an underwater vehicle, a box configured to contain and release the marker, a suction cup coupled to the box configured to attach to the box a surface of an underwater vehicle, a release mechanism coupled to the box configured to detach the box from a bite plate and release the marker, and the bite plate selectively coupled to the release mechanism.

20 Claims, 5 Drawing Sheets

(56) References Cited

U.S. PATENT DOCUMENTS

| | | | |
|---|---|---|---|
| 10,315,749 B1* | 6/2019 | Walker | D04H 3/011 |
| 10,323,911 B1* | 6/2019 | Krauss | F41H 11/05 |
| 2009/0107388 A1* | 4/2009 | Crowell | B63G 8/00 |
| | | | 367/141 |
| 2021/0128980 A1* | 5/2021 | Ryan | A63B 24/0062 |

* cited by examiner

300 providing a disabling device, further comprising a plurality of entanglement lines; a box configured to contain the plurality of entanglement lines; a suction cup coupled to the box configured to attach the box to a surface of an underwater vehicle; a release mechanism coupled to the box configured to detach the box from a bite plate and release the plurality of entanglement lines; the bite plate selectively coupled to the release mechanism; attaching the disabling device cup to an underwater vehicle, wherein attaching comprises a marine animal impacting the underwater vehicle; and releasing each of the plurality of entanglement lines, wherein releasing each of the plurality of entanglement lines disables the underwater vehicle attaching the disabling device cup to an underwater vehicle, wherein attaching comprises a marine animal impacting the underwater vehicle releasing each of the plurality of entanglement lines

Figure 5

COUNTER-UNDERWATER VEHICLE APPARATUS AND MARKER

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case No. 113,685.

FIELD OF USE

The present disclosure pertains generally to an underwater vehicle attachment and disabling mechanism apparatus, system, and method.

BACKGROUND

Underwater vehicles are difficult to identify, track, and disable. In particular, unmanned underwater vehicles ("UUVs") may pose an even greater challenge because of their slim profiles and discrete footprint. Due to advancements in behavioral training techniques, marine animals, such as dolphins and sea lions, are able to assist their handlers with intricate tasks. In particular, marine animals are capable of identifying objects in the water and can be trained to interact with those objects. Moreover, their agility and finely tuned senses in aquatic environments have create opportunity for new underwater vehicle marking and disabling techniques.

SUMMARY

According to illustrative embodiments, a counter-underwater vehicle apparatus and marker. Moreover, a counter-underwater vehicle apparatus comprising a plurality of entanglement lines; a box configured to contain the plurality of entanglement lines; a suction cup coupled to the box configured to attach the box to a surface of an underwater vehicle; a release mechanism coupled to the box configured to detach the box from a bite plate and release the plurality of entanglement lines; and the bite plate selectively coupled to the release mechanism. Additionally a marker configured to highlight the location of an underwater vehicle, a box configured to contain and release the marker, wherein the marker is contained within an internal cavity of the box, a suction cup coupled to the box configured to attach to the box a surface of an underwater vehicle, a release mechanism coupled to the box configured to detach the box from a bite plate and release the marker, and the bite plate selectively coupled to the release mechanism. Finally, a method of disabling underwater vehicles comprising the steps of providing a disabling device, further comprising a plurality of entanglement lines; a box configured to contain the plurality of entanglement lines; a suction cup configured to the box configured to attach the box to a surface of an underwater vehicle; a release mechanism coupled to the box configured to detach the box from a bite plate and release the plurality of entanglement lines; the bite plate selectively coupled to the release mechanism; attaching the disabling device cup to an underwater vehicle, wherein attaching comprises a marine animal impacting the underwater vehicle; and releasing each of the plurality of entanglement lines, wherein releasing each of the plurality of entanglement lines disables the underwater vehicle.

It is an object to provide a counter-underwater vehicle apparatus and marker and method of disabling underwater vehicles that offers numerous benefits, including disabling underwater vehicles, marking and/or tracking underwater devices, wherein the underwater vehicles include, but are not limited to, unmanned underwater vehicles.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings:

FIG. 5 is a block flow diagram of a method of disabling underwater vehicles.

DETAILED DESCRIPTION OF EMBODIMENTS

The disclosed apparatuses and method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatuses and methods described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
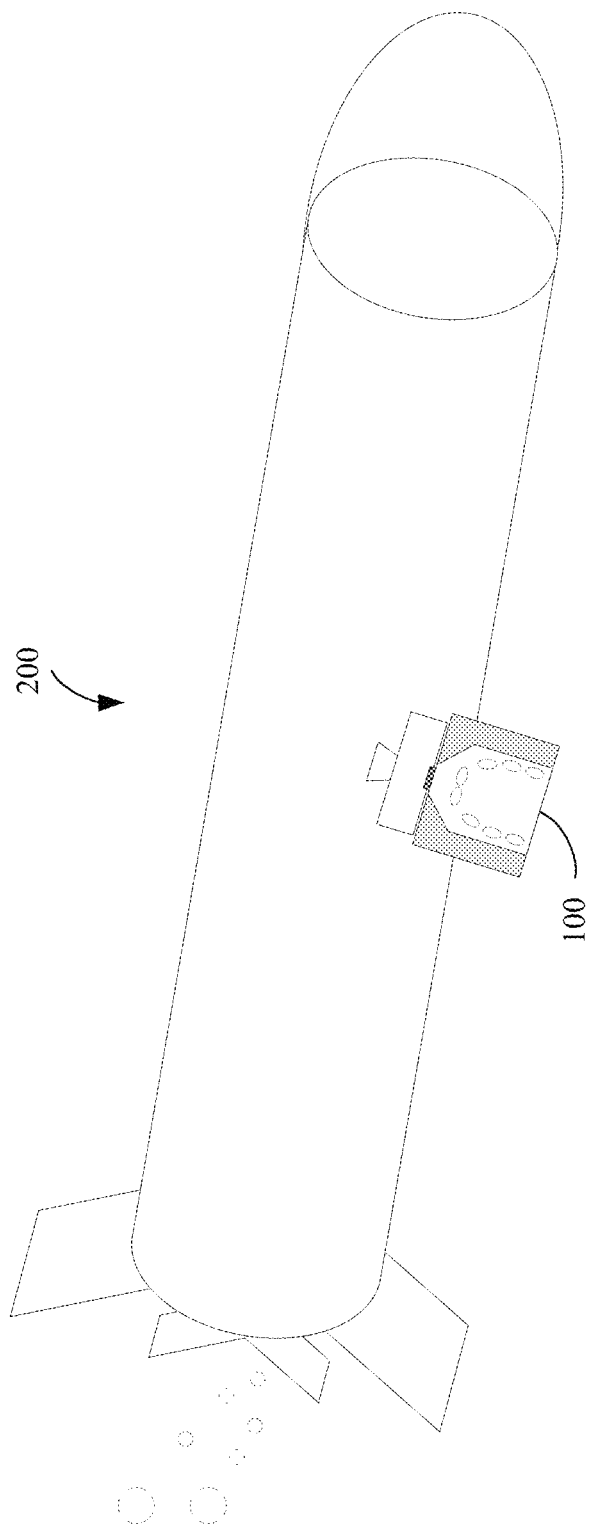
FIG. 1 is an illustration of a counter-underwater vehicle apparatus attached to an underwater vehicle.

FIG. 1 is an illustration of a counter-underwater vehicle apparatus 100 attached to an underwater vehicle 200. This apparatus 100 may be used in any aquatic environment. Furthermore, the counter-underwater vehicle apparatus 100 may be attached to a moving or stationary underwater vehicle 200. Moreover, the counter-underwater vehicle apparatus 100 may be attached to any smooth surface which is externally accessible. The smooth surface may consist of an exposed hull or vessel body and would not consist of rivets or weld lines. In one embodiment, the counter underwater vehicle apparatus 100 may attach to an unmanned underwater vehicle ("UUV"). Attaching the counter-underwater vehicle apparatus 100 to the underwater vehicle 200 may be achieved by deploying a marine animal to attach the apparatus 100. For example, the counter-underwater vehicle apparatus 100 may be deployed by a sea lion.

Figure 2:
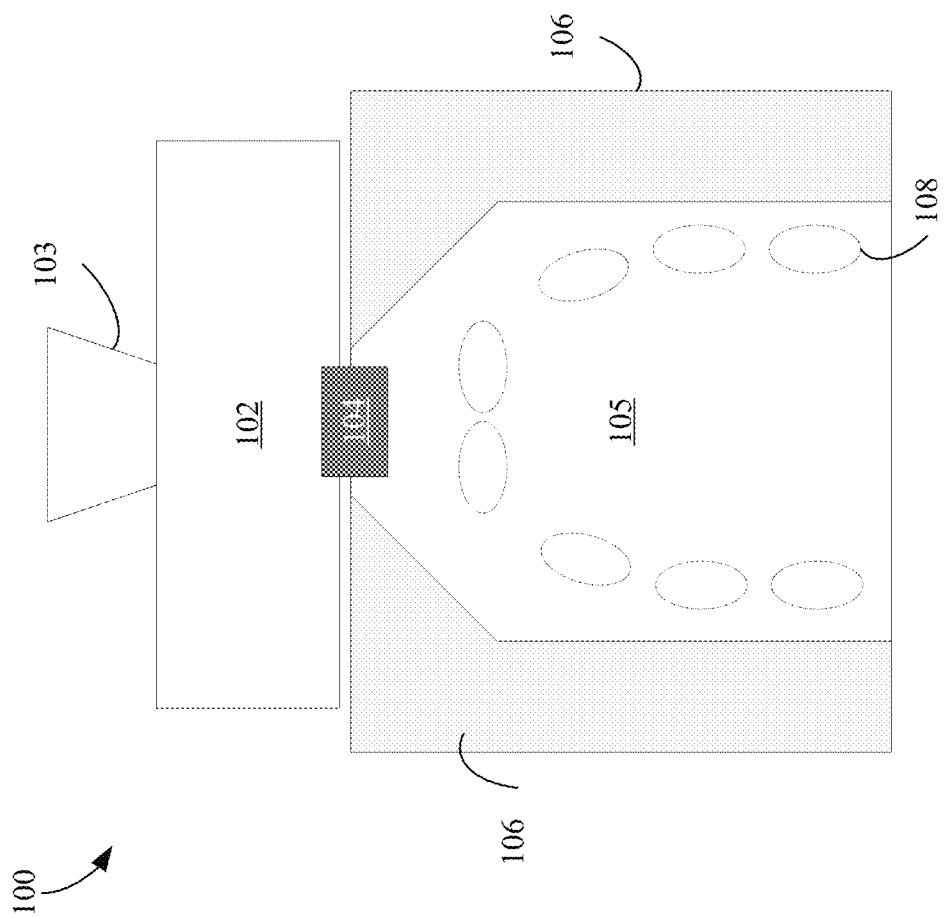
FIG. 2 is an example illustration of a counter-underwater vehicle apparatus.

FIG. 2 is an example illustration of a counter-underwater vehicle apparatus 100 comprising a plurality of entanglement lines 101, a box 102, suction cup 103, release mechanism 104, and bite plate 105. The plurality of entanglement lines 101 may be contained in the box 102. The plurality of lines 101 are situated so as to allow for a deployed end of each of the plurality of lines 101 to be released and drag behind the box, while one opposite end of each of the plurality of lines 101 remains fixed to the box. In one embodiment, the plurality of lines 101 are spooled within the box 102. The box 102 is coupled to suction cup 103 and a release mechanism 104. The release mechanism 104 is further connected to the bite plate 105, while also being configured to release the bite plate 105 from the box 102. FIG. 2 also depicts a plurality of bite marks 108 on bite plate 105, however these marks are only illustrative and this disclosure is not so limited.

The plurality entanglement lines 101 are released from the box 102 and may be configured to disrupt the propulsion system of the underwater vehicle. As the lines are released from the box 102, they may drag behind the counter-underwater vehicle apparatus 100 and may, for example, jam a propeller. Accordingly, at least one of the plurality of entanglement lines 101 may have a length sufficient to reach the propulsion system of the targeted underwater vehicle. The length of each of the plurality of entanglement lines 101 may reach beyond the propulsion system, but their size is limited by the parameters of the box 102 and a weight the marine animal is able to manipulate. It is typical for an unmanned underwater vehicle to surface itself when its engine becomes disabled, which is a desirable result of the disclosure herein. When the propulsion of a typical unmanned underwater vehicle stops for example, by entanglement, the system's ability to determine its heading and depth can no longer be maintained. Therefore, the device will then either float to the surface or sink.

Each of the plurality of entanglement lines 101 comprises two ends: a deployed end, which is deployed to disrupt a propulsion system, and a box end, which is coupled to the box 102. The plurality of entanglement 101 lines are attached or coupled to a main deployment line or on either one or both sides of the box 102. Furthermore, the plurality of entanglement lines 101 may have a variety of effective geometries. For example, they may be a single strand, or a plurality of single strands. As another example, the plurality of lines may comprise drogues. As another example, a single strand may be supplemented with additional offshoots of lines (see FIG. 1), which has benefits of improving drag and increasing spread of the lines. Moreover, the plurality of enablement lines 101 may comprise high modulus polyethylene ("HMPE"). HMPE fibers are simultaneously high strength and light weight. Each of the plurality of entanglements lines 101 may require sufficient strength so as to properly disrupt the propulsion device, and not be so weak as to be overcome by the engine. In another embodiment, each of the plurality of entanglement lines 101 may further comprise a parachute at the deployed end. The parachutes may offer a variety of benefits, including faster deployment of each of the entanglement lines 101 or disrupting the motion of the underwater vehicle 102.

The box 102 is a container for the plurality of entanglement lines 101 and may support the suction cup 103. The box 102 may be any shape capable of housing the lines 101 and may further comprise a plurality of spools 107 (see FIG. 4) for the plurality of entanglements lines 101. The box may also be selectively disconnected from the bite plate 105 via a release mechanism 104. In one embodiment, the box 102 has a streamlined shape for improved hydrodynamics.

In another embodiment, the box 102 may further comprise a swivel, which may be situated between the box 102 and the suction cup 103. The swivel allows the box 102 to pivot with respect to the release mechanism. The swivel may allow the counter-underwater vehicle apparatus to attach to the underwater vehicle 200 at a broader range of approach angles.

In another embodiment, the box 102 may further comprise a plurality of alignment guides configured to improve the angle of approach and attachment of the counter-underwater vehicle apparatus 100. The angle of the approach comprises the range of angles at which the suction cup may properly attach to an underwater vessel 200. Alignment guides may be tubular rods coupled to the exterior of the box, protruding from the box 102 outward, towards the desired attachment location. The alignment guides have a minimal length of prevent the approach and attempted attaching at an angle insufficient for the suction cup 103 to form at attachment. However, the alignment guides would also have a maximum length of not so long as to prevent the suction cup from reaching the attachment sight at a perpendicular angle to the underwater vehicle's 200 surface.

In another embodiment, the box 102 may further comprise box float configured to float the box to the surface. The box float may help the marine animal's handler retrieve the system if attachment to the underwater vehicle 200 fails. The float may be made out of any buoyant material and is coupled to the exterior of the box in a way that does not interfere with attachment or the bite of the marine animal.

The suction cup 103 is configured to attach to an underwater vehicle and may comprise a plurality of materials having a unique hardness on a durometer scale. The durometer of the suction cup 103 determines its attachment properties to an underwater vehicle. A high durometer cup will be more durable and provide stronger suction to a flat surface. On the other hand, a low durometer cup will provide better suction to contoured materials. Obtrusions on a smooth surface, such as rivets or seams, may pose attachments challenges to the suction cup 103.

In one embodiment, the suction cup comprises two material. In particular, a high durometer material at the base of the suction cup, nearest the box 102, and a low durometer material at the top of the suction cup 103, nearest the interface with the underwater vehicle 200. The base of the suction cup 103 may be, for example, the bottom half of the suction cup 103 and the top of the suction cup 103 may be the upper half of the suction cup 103. This particular assemblage offers a suction cup 103 with high durability and strong suction for contoured attachments surfaces.

The release mechanism 104, in one embodiment, is selectively coupled to the bite plate 105 and coupled box 102 and is configured to decouple the box 102 from the bite plate 105. In another embodiment, the release mechanism 104 is coupled to the bite plate 105 and selectively coupled box 102 and is configured to decouple the bite plate 105 from the box 102 from the bite plate 105. Additionally, the release mechanism may release the plurality of entanglement lines 101 from the box 102. To activate the release mechanism, the marine mammal deploying the counter-underwater vehicle apparatus 100 must impact the underwater vehicle 200. The pressure from the impact instigates the decoupling of the box 102 and bite place 105. For example, the release mechanism 104 is a pressure sensitive release.

The bite plate 105 is of a size and shape suitable for a marine animal to bite. This behavior is typically one that is trainable for animals including, but not limited to, dolphins and sea lions. The bite plate 105 is provided to the animal to hold and carry during deployment. Once the animal identifies a target, they deploy the apparatus 100 by impacting the target, typically head on, while carrying the bite plate 105. During and after the impact, the bite plate 105 may remain in the animal's mouth. If the animal surfaces with a decoupled bite plate 105, it may indicate to a handler that the target was found, and a successful placement was made.

Additionally, the bite plate 105 may comprise plurality of floats 106. The plurality of floats 106 may allow a trainer/operator to recover the bite plate 105 or apparatus 100 if the marine animal releases it underwater. In one embodiment, the plurality of floats 106 are coupled to the bite plate 105 and/or box 102. The plurality of floats 106 may be configured to float the bite plate or box to the surface of the aquatic environment. The float may line the edges of the bite plate 105 or box 102, but do not interfere with the animals bite or the release mechanism.

Figure 3:
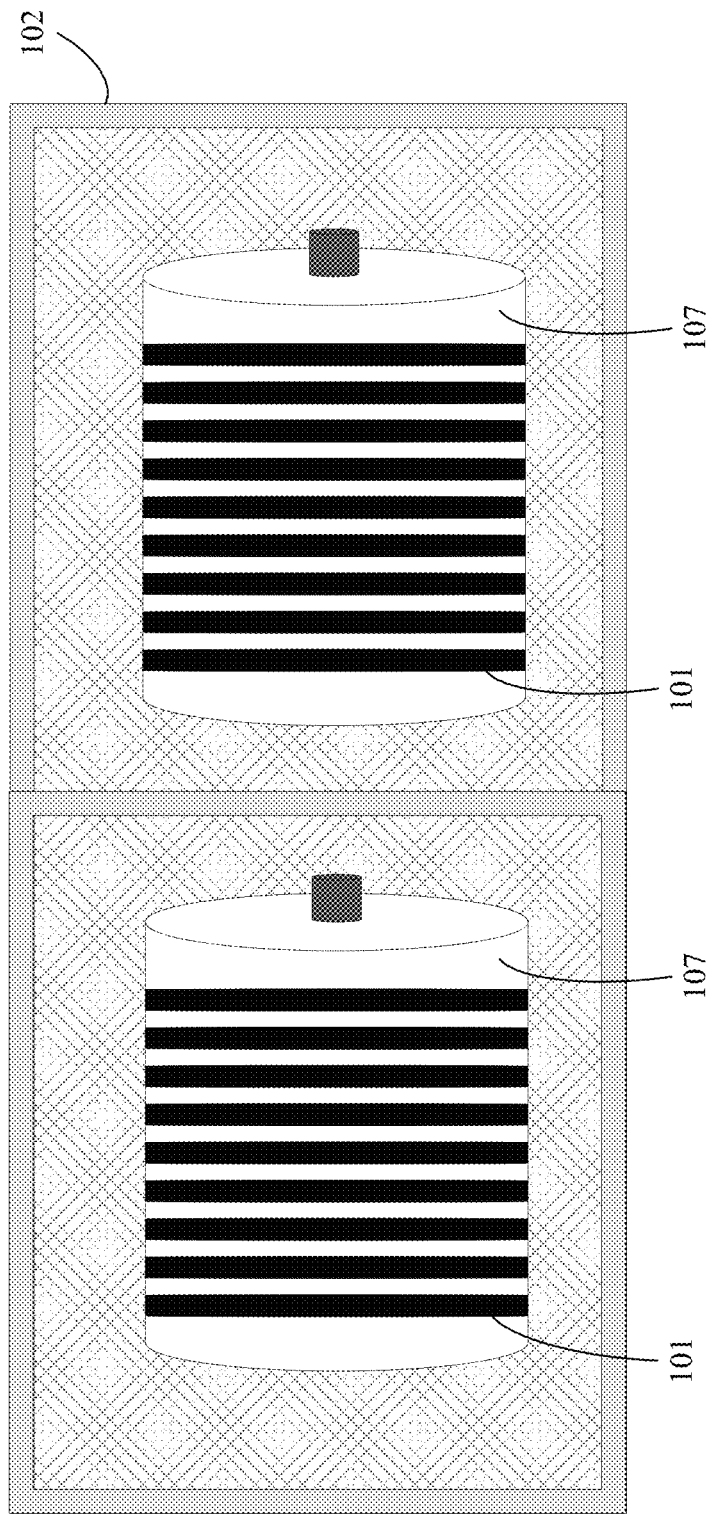
FIG. 3 is an illustration of a box containing a plurality of entanglement lines and a spool.

FIG. 3 is an illustration of a box 102 containing a plurality of entanglement lines 101 and a spool 107. The box 102 may comprise a unitary container and internal cavity, or a plurality of containers, each having an internal cavity. For example, each of the plurality of entanglement lines may be stored in a separate container with the box 102. In the aquatic environment, the shape of the counter-underwater vehicle apparatus 100 may impact the ability of a marine animal to achieve an optimal placement. Therefore, the box 102 may have a shaped as a rectangular prism having an external side and an internal cavity, but may also have rounded corners for hydrodynamics. The rounded edges may streamline the delivery of the counter-underwater vehicle apparatus 100 to the underwater vehicle 200. The internal cavity store the entanglement lines 101 prior to and, for some portion of the lines, during their release. The box 102 may further prevent the entanglement lines from premature deployment. Moreover, FIG. 3 shows a plurality of entanglement lines 101 wrapped around a spool 107, but this disclosure is not so limited. The entanglement lines 101 may be configured or confined in any manner in which they are capable of deployment. Deployment of entanglement lines 101 consists of their release from the box 102 sufficient to impact the mobility of the underwater vehicle. In one embodiment, the entanglement lines 101 are deployed at a length sufficient to disrupt a rear propeller of the underwater vehicle 200.

Figure 4:
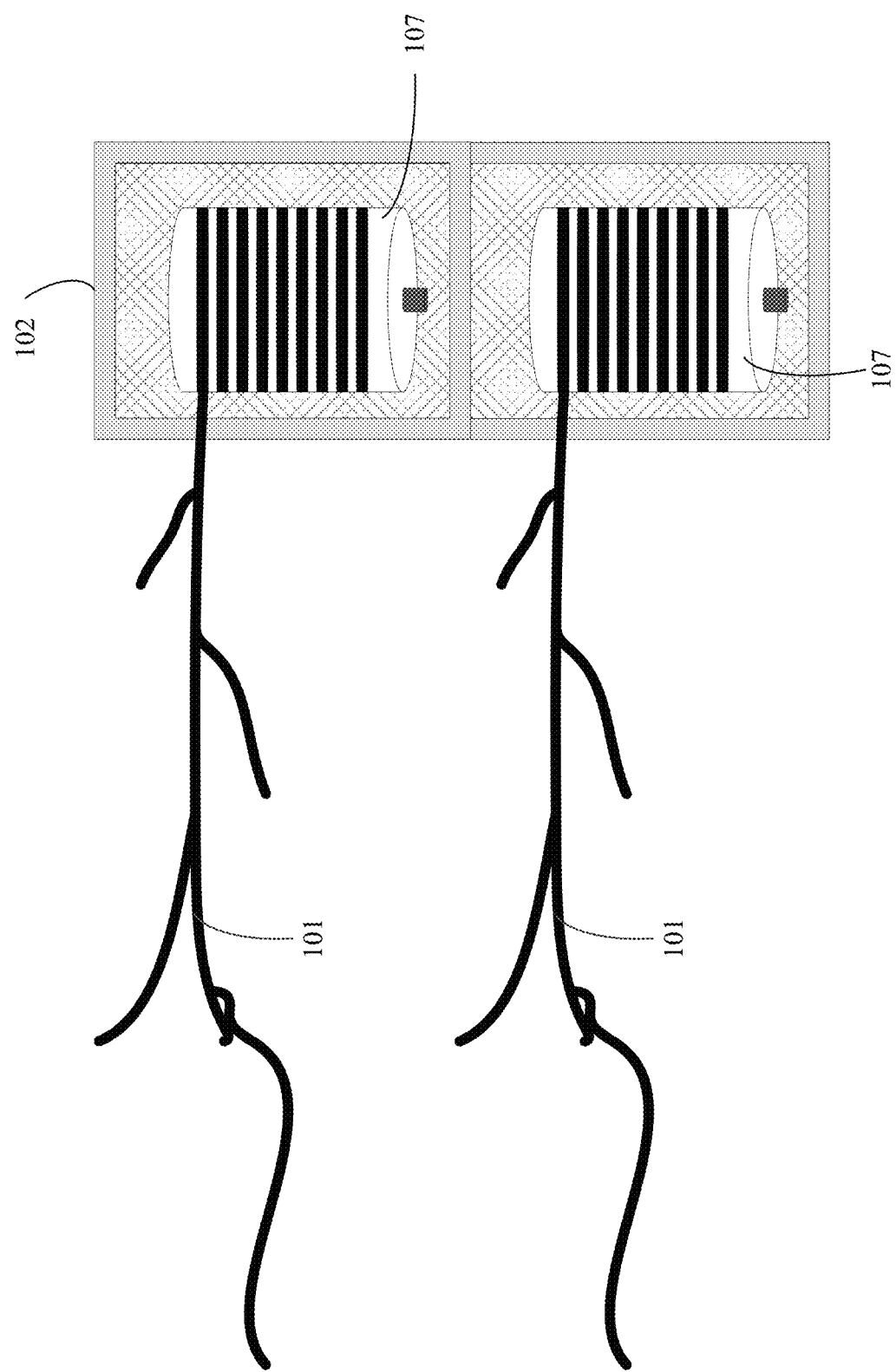
FIG. 4 is an illustration of a box and a plurality of unspooled entanglement lines.

FIG. 4 is an illustration of a box 102 and a plurality of unspooled entanglement lines 101, and further comprising two distinct containers each having an internal cavity. Although FIG. 4 again displays a spool configured to deploy the lines, this disclosure is not so limited. The entanglement lines 101 may be configured or confined in any manner in which they are capable of deployment. As the entanglement lines are deployed, they may create drag and be pulled out by the movement of the water. The drag may be utilized to get the entanglement lines 101 into position so as to disrupt the rear propulsion system of the underwater vehicle. In one embodiment, the plurality of entanglement lines further comprise a series of interconnected entanglement lines having unique lengths. Adding a series of interconnected entanglement lines offers numerous benefits, such as increased surface area for drag, which improves the likelihood of that the underwater vessel will be obstructed.

In another embodiment, a counter-underwater vehicle apparatus 100 may comprise a marker, a box 102, a suction cup 103, a release mechanism 104, and a bite plate 105. The suction cup 103, release mechanism 104, and bite plate 105 may be similar to those previously described. A marker may help an operator identify the position of an underwater vehicle. Similar to the plurality of entanglement lines 101, the marker is released from the box 102 and remains attached to the underwater vehicle 200 via a coupling to a suction cup, which is further suctioned to the vessel. The marker, for example, may be a visible dye that contrasts with the surrounding water so that it can be visually located by an onlooker. Moreover, the release of the marker may be released instantaneously, have a time-delayed effect, or have a release duration to show the movement of the underwater vehicle 200 over a period of time.

The counter-underwater vehicle apparatus 100 having a marker may also be used for identifying a downed or stationary underwater vehicle. In a challenging ocean environment, a marine animal may be able to locate and deploy a marker onto an underwater vehicle 200 that could not be identified using traditional radar methods. The placed apparatus 100 and marker may then assist in locating of that downed or stationary underwater vehicle by an operator or handler.

FIG. 5 is a block flow diagram of a method of disabling underwater vehicles 300 comprising the steps of providing a disabling device, further comprising a plurality of entanglement lines; a box configured to contain the plurality of entanglement lines; a suction cup coupled to the box configured to attach the box to a surface of an underwater vehicle; a release mechanism coupled to the box configured to detach the box from a bite plate and release the plurality of entanglement lines; the bite plate selectively coupled to the release mechanism; attaching the disabling device cup to an underwater vehicle, wherein attaching comprises a marine animal impacting the underwater vehicle; and releasing each of the plurality of entanglement lines, wherein releasing each of the plurality of entanglement lines disables the underwater vehicle. The method may also include identifying the location of the underwater vehicle.

From the above description of a counter underwater vehicle disabling device and marker it is manifest that various techniques may be used for implementing the concepts of a counter-underwater vehicle apparatus, counter-underwater vehicle marker, and method of disabling underwater vehicles without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the a counter-underwater vehicle apparatus, and method of disabling underwater vehicles is not limited to the particular embodiments described herein, but is capable of many embodiments without departing from the scope of the claims.

What is claimed:

1. A counter-underwater vehicle apparatus, comprising:
    a plurality of entanglement lines;
    a box configured to contain the plurality of entanglement lines;
    a suction cup coupled to the box configured to attach the box to a surface of an underwater vehicle;
    a release mechanism coupled to the box configured to detach the box from a bite plate and release the plurality of entanglement lines; and
    the bite plate selectively coupled to the release mechanism.

2. The counter-underwater vehicle apparatus of claim 1, wherein the bite plate facilitates the bite of a marine animal.

3. The counter-underwater vehicle apparatus of claim 1, wherein the suction cup further comprises:
    a base of the suction cup comprising a high durometer material;
    a top of the suction cup comprising a low durometer material.

4. The counter-underwater vehicle apparatus of claim 1, wherein the plurality of entanglement lines each are comprised of high modulus polyethylene.

5. The counter-underwater vehicle apparatus of claim 1, wherein the plurality of entanglement lines further comprise a parachute at a deployed end of each of the plurality of entanglement lines.

6. The counter-underwater vehicle apparatus of claim 1, wherein the plurality of entanglement lines each have a unique length.

7. The counter-underwater vehicle apparatus of claim 1, wherein the box further comprises:
    a plurality of spools configured to deploy the plurality of entanglement lines.

8. The counter-underwater vehicle apparatus of claim 1, wherein the bite plate further comprises:
    a bite float coupled to the bite plate configured to float the bite plate to the surface of the aquatic environment.

9. The counter-underwater vehicle apparatus of claim 1, wherein the box further comprises:
    a box float coupled to the box configured to float the box to the surface of the aquatic environment.

10. The counter-underwater vehicle apparatus of claim 1 further comprising:
    a swivel connected to the release mechanism configured to enable a wider range of attachment angles.

11. The counter-underwater vehicle apparatus of claim 1, further comprising:
    a plurality of alignment guides coupled to the box configured to prevent the suction cup from impacting the counter-underwater vehicle apparatus at an angle outside of an approach angle, wherein each of the plurality alignment guide protrude from the box in the direction of the suction cup.

12. A counter-underwater vehicle marker, comprising:
    a marker configured to highlight the location of an underwater vehicle;
    a box configured to contain and release the marker, wherein the marker is contained within an internal cavity of the box;
    a suction cup coupled to the box configured to attach to the box a surface of an underwater vehicle;
    a release mechanism coupled to the box configured to detach the box from a bite plate and release the marker; and
    the bite plate selectively coupled to the release mechanism.

13. The counter-underwater vehicle marker of claim 12, wherein the marker is a dye.

14. The counter-underwater vehicle marker of claim 12, wherein the bite plate facilitates the bite of a marine animal.

15. The counter-underwater vehicle apparatus of claim 12, wherein the box further comprises:
    a swivel connected to the release mechanism configured to enable a wider range of attachment angles.

16. The counter-underwater vehicle apparatus of claim 12, further comprising:
    a plurality of alignment guides coupled to the box configured to improve the angle of approach and attachment of the counter-underwater vehicle apparatus.

17. A method of disabling underwater vehicles comprising the steps of:
    providing a disabling device, further comprising:
        a plurality of entanglement lines;
        a box configured to contain the plurality of entanglement lines;
        a suction cup coupled to the box configured to attach the box to a surface of an underwater vehicle;
        a release mechanism coupled to the box configured to detach the box from a bite plate and release the plurality of entanglement lines;
        the bite plate selectively coupled to the release mechanism;
    attaching the disabling device cup to an underwater vehicle, wherein attaching comprises a marine animal impacting the underwater vehicle; and
    releasing each of the plurality of entanglement lines, wherein releasing each of the plurality of entanglement lines disables the underwater vehicle.

18. The method of disabling underwater vehicles of claim 17, further comprising the step of:
    identifying the location of the underwater vehicle.

19. The method of disabling underwater vehicles of claim 17, wherein the bite plate facilitates the bite of a marine animal.

20. The method of disabling underwater vehicles of claim 17, wherein the plurality of entanglement lines each are comprised of high modulus polyethylene.

* * * * *